United States Patent [19]

Oetiker

[11] Patent Number: 5,390,395
[45] Date of Patent: Feb. 21, 1995

[54] EARLESS, STEPLESS CLAMP STRUCTURE

[75] Inventor: Hans Oetiker, Horgen, Switzerland

[73] Assignee: Hans Oetiker AG Maschioen- und Apparatefabrik, Zurich, Switzerland

[21] Appl. No.: 163,533

[22] Filed: Dec. 9, 1993

[51] Int. Cl.6 .............................................. B65D 63/02
[52] U.S. Cl. .................................... 24/20 R; 24/20 TT
[58] Field of Search ............. 24/20 R, 20 TT, 20 EE, 24/20 CW

[56] References Cited

U.S. PATENT DOCUMENTS

| | | | |
|---|---|---|---|
| 973,532 | 10/1910 | McLaughlin | 24/20 TT |
| 1,786,612 | 12/1930 | Heslop | 24/20 TT |
| 2,318,816 | 5/1943 | Tinnerman | 24/20 TT |
| 4,907,319 | 3/1990 | Calmettes et al. | 24/20 R |
| 4,987,651 | 1/1991 | Oetiker | 24/20 R |

Primary Examiner—James R. Brittain
Attorney, Agent, or Firm—Paul M. Craig, Jr.

[57] ABSTRACT

A so-called stepless clamp structure whose clamping band is provided at one end with a tongue-like extension and whose other end is provided with a slot-like opening. Outwardly extending hooks on the tongue-like extension are adapted to engage with the bent-up end section of the other end which is of such length that a small part of the slot-like opening is present in the bent-up end section whereby the depth of the small part of the slot-like opening is less than twice the thickness of the clamping band but slightly greater than the thickness of the clamping band.

26 Claims, 2 Drawing Sheets

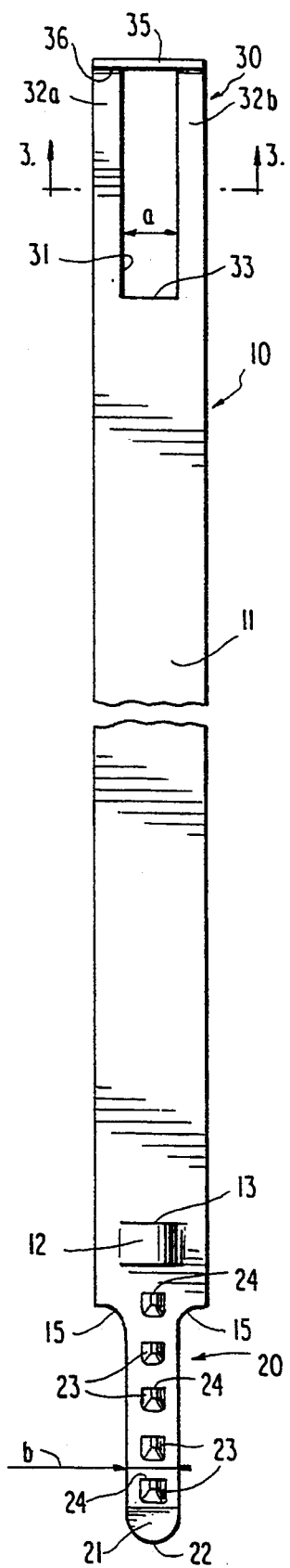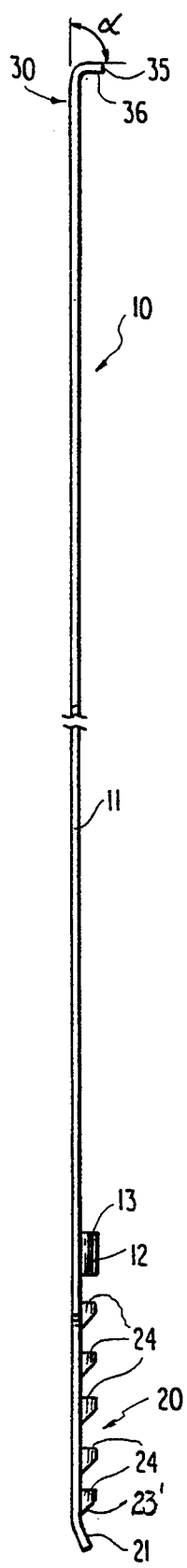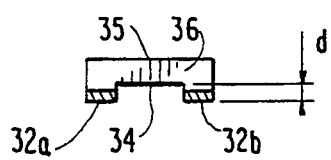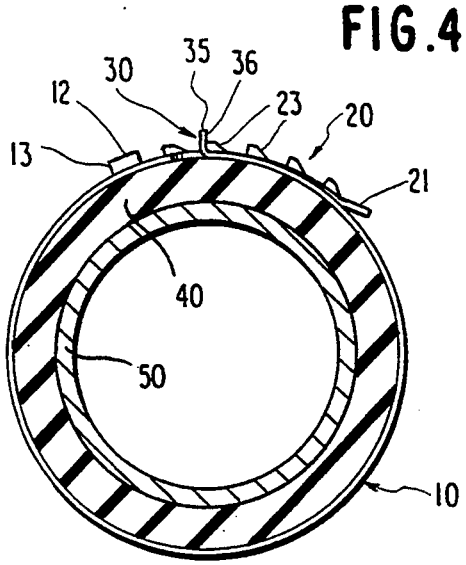

EARLESS, STEPLESS CLAMP STRUCTURE

The present invention relates to a clamp structure, and more particularly to a clamp structure offering internal clamping surfaces devoid of discontinuities, steps or offsets to assure a fluid-tight connection of the object to be fastened thereby over the entire circumference.

BACKGROUND OF THE INVENTION

A distinction is made in the art between so-called closed or endless clamp structures made from tubular stock and so-called open clamp structures made from band material. In contrast to the former, the latter have to have their open ends, which usually overlap, mechanically connected in use. In addition to these clamp structures, devices for fastening, for example, cable strands are known in the prior art which are made from plastic material with serrations at one end adapted to engage in an eyelet with or without detent at the other end. Clamp structures, to be successful these days, especially in applications utilizing relatively hard and thin plastic hoses, such as in the automotive industry, must be able to assure internal clamping surfaces devoid of any discontinuity, steps or offsets to assure a fluid-tight connection. Moreover, there is an ever-present desire to simplify the construction and therewith reduce the manufacturing cost of clamp structures meeting these requirements.

Clamp structures are known in which hook-like elements are provided near one end which are adapted to engage in an eyelet at the other end. For example, Swiss Patent 153,565 discloses a clamp structure consisting of a clamping band provided with outwardly extending detent members at one end adapted to engage with the edge of a transverse slot provided in an enlarged part of the opposite end. Apart from wastefulness in the loss of material as a result of the enlarged end part, the clamp structure disclosed in this patent does not satisfy the requirements for fluid-tight connection.

The German Offenlegungsschrift 23 59 284 discloses a clamp structure which includes a tongue-like extension near one end provided with outwardly extending teeth while the opposite end is provided with a slot-like opening into which the tongue-like extension is able to extend so that a springy tongue spaced from the opposite end which projects into the slot-like opening is able to engage with the teeth on the tongue-like extension during tightening of the clamp structure. Apart from a limited holding ability of the clamp structure disclosed in this patent, they also do not assure a completely fluid-tight installation because of the existence of internal steps, offsets or discontinuities.

SUMMARY OF THE INVENTION

Accordingly, it is an object of the present invention to provide a clamp structure which assures a completely satisfactory fluid tightness of the object to be fastened thereby, and at the same time is extraordinarily simple in construction to permit low-cost manufacture.

Another object of the present invention resides in a clamp structure which offers completely satisfactory fluid tightness yet is easy to install and equally easy to disassemble from the object to be tightened thereby.

A further object of the present invention resides in a clamp structure made from a metal band material which offers the advantage of a completely satisfactory fluid tightness combined with simplicity in design.

Still another object of the present invention resides in a clamp structure which not only avoids the disadvantages of the aforementioned prior art but which can be made to compensate for temperature and/or pressure fluctuations notwithstanding the use of a band material being substantially devoid of elastic stretchability in the longitudinal direction of the clamp.

The underlying problems are solved according to this invention in that the clamping band is provided at one end with a tongue-like extension and its other end is provided with a slot-like opening. Outwardly extending hooks on the tongue-like extension are adapted to engage with the bent-up end section of the other end which is of such length that a small part of the slot-like opening is present in the bent-up end section whereby the depth of the small part of the slot-like opening is less than twice the thickness of the clamping band but slightly greater than the thickness of the clamping band.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention and wherein:

FIG. 1 is a top plan view on a clamp structure in accordance with the present invention;

FIG. 2 is a side elevational view of the clamp structure of FIG. 1;

FIG. 3 is a cross-sectional view, taken along line 3—3 of FIG. 1;

FIG. 4 is an axial elevational view showing the clamp structure of FIGS. 1–3 in the installed condition;

FIG. 5 is a partial side elevational view of a modified embodiment of a clamp structure in accordance with the present invention which is provided with undulations to impart elastic stretchability in the longitudinal direction of the clamping band;

FIG. 6 is a partial top plan view on the clamp structure of FIG. 5;

DETAILED DESCRIPTION OF THE DRAWINGS

Figure 7:
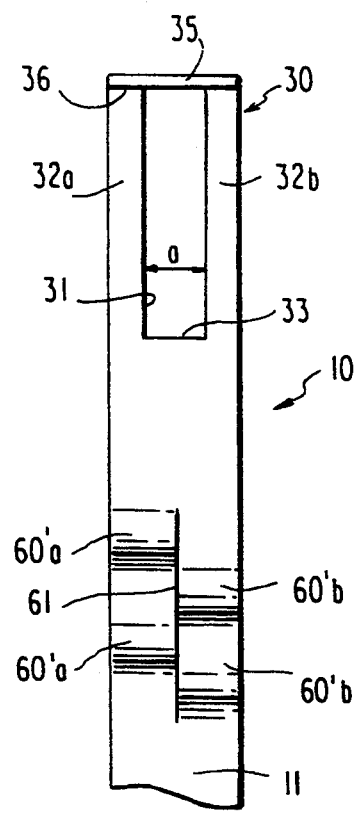
FIG. 7 is a partial top plan view on a modified clamp structure in accordance with the present invention.

Referring now to the drawing wherein like reference numerals are used throughout the various views to designate corresponding parts, and more particularly to FIGS. 1 through 4, reference numeral 10 generally designates therein the clamp structure in accordance with the present invention which comprises a clamping band 11 preferably made from stainless or galvanized steel or spring band steel. The clamp structure 10 includes at one end a tongue-like extension generally designated by reference numeral 20 which has a bent-up free end portion 21 rounded-off at 22 (FIG. 1). The tongue-like extension 20 is provided with a number of outwardly extending cold-deformed hooks 23 which can be constructed as disclosed in my prior U.S. Pat. No. 4,299,012. More specifically, the hooks 23 are made by cold deformation, pressed-out by deep-drawing after a transverse cut so as to be integral over the remaining contour with the clamping band in order to be able to withstand substantial tightening forces in the longitudinal direction of the clamping band. The hooks 23 are thus provided with a substantially transversely extending engaging surfaces 24 formed by the end edges of the thus-formed hooks.

The opposite end portion generally designated by reference numeral 30 of the clamp structure 10 includes a substantially rectangular slot-like opening 31 defined by the longitudinally extending inner surfaces of the remaining lateral band portions 32a and 32b, by the transverse end surface 33 away from the free end of the end portion 20 (FIG. 1) and by the transverse end surface 34 (FIG. 3) in the bent-up end section 35. The arrangement according to the present invention is made in such a manner that a small part of the slot-like opening 31 extends also into the bent-up section 35 as shown in FIG. 3. This contributes to a completely satisfactory fluid-tight installation of the object to be fastened by the clamp structure in accordance with the present invention. The width a of the slot-like opening 31 is thereby at least slightly wider than the width b of the tongue-like extension. The surface 36 of the bent-up end section 35 facing the clamping band 11 thereby constitutes one tool-engaging surface while the other tool-engaging surface 13 is formed by the transversely extending surface in the outwardly extending tunnel-like embossment 12 which is formed by pressing out by deep-drawing the band material after two transverse cuts are made. The other tool-engaging surface 13 is thus formed by the edge surface of the tunnel-shaped embossment 12 opposite the tongue-like extension 20. The depth d of the part of the slot-like opening in the bent-up end portion 35 may be slightly more than the thickness of the clamping band but less than twice the thickness of the thickness of the clamping band and preferably not to exceed the thickness of the clamping band by more than about 25%.

After being placed about the object to be tightened thereby such as a hose-like object 40 to be mounted on a fixed or rotary part 50, a conventional pincer-like tool is engaged at the tool-engaging surfaces 13 and 36 to tighten the clamp until the bent-up portion 35 engages with the engaging surface 24 of the corresponding hook 23. A completely satisfactory fluid-tight installation is assured by the particular configuration of the clamp structure according to this invention over 360° of the circumference of the hose-like object 40.

The clamp structure of this invention is also reusable, i.e., the connection of the ends of the clamp structure can be disengaged again by merely utilizing the same pincer-like tool as also used for tightening the clamp structure in such a manner as to engage the pincer-like tool at the bent-up end 35 and then either pull the bent-up end 35 radially outwardly or tilt the tool toward the embossment 12 which causes disengagement of the clamp.

To avoid stresses, the transition portions 15 from the normal clamping band width to the tongue-like extension 20 may be rounded-off with a relatively larger radius of curvature as shown in FIG. 1 while the bent-up end section 35 is bent up with a relatively smaller radius of curvature as shown in FIG. 2.

Furthermore, if the hooks 23 are made, not by a rectilinear transverse cut before deep-drawn cold-deformation, but by a cut approximately V-shaped away from the free end of the tongue-like extension 20 with a more-or-less rounded-off tip, then the engaging surface 24 of a cold-deformed hook 23 will also slant rearwardly downwardly in the direction toward the free end of the tongue-like extension 20. The angle $\zeta$ and the slope of the engaging surfaces 24 can thereby be made so as to be complementary to one another.

The angle $\zeta$ shown in FIG. 2, which is subtended by the bent-up section 35, is shown as approximately 90°. However, as pointed out above, it may be advantageous to decrease this angle in order to further enhance the holding ability of the clamp. The angle $\zeta$ preferably does not deviate from the right angle by more than about 25° to preserve the reusability of the clamp.

The depth d should be kept as closes as possible to the thickness of the clamping band, yet permit the hooks 23 to pass underneath the surface 34 during assembly which can be readily determined empirically for each design. As long as the clamp is not fully tightened, the inner clamping surface in the area of the bent up end portion 35 can slightly lift off from the outer surface of the object to be fastened to permit the hooks 23 to pass underneath the same which is further assisted by the slanting back surfaces 23' of the hooks 23.

The thickness as well as length and other dimensions of the various parts of the clamp structure such as the height of the hooks 23, with the exception of the depth d, can be chosen at will to satisfy particular applications and designs.

Figure 8:
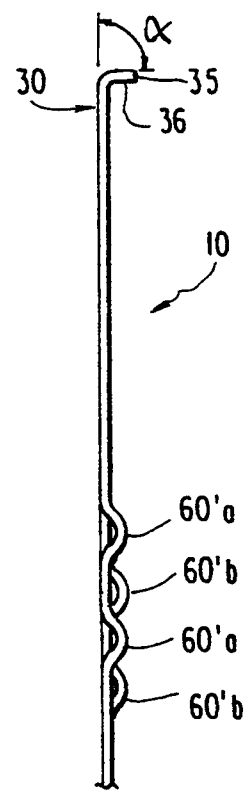
FIG. 8 is a partial side elevational view of the clamp structure of FIG. 7.

If the clamp structure according to this invention is made from galvanized steel, stainless steel or spring band steel, such material, as is known, is substantially devoid of any elastic stretchability in the longitudinal direction of the clamping band. In order to compensate for tolerances, as also for temperature and/or pressure fluctuations, the clamp structure in accordance with the present invention may also be provided with tolerance-compensating undulations 60a and 60b (FIGS. 5 and 6) provided in the lateral band portions 32a and 32b. In order not to jeopardize the fluid-tight connection, these undulations 60a and 60b are mutually displaced with respect to one another in the longitudinal direction of the clamping band on opposite sides of the slot-like opening 31, as disclosed, for example, in my prior U.S. Pat. No. 5,230,126. It is also understood that these compensating undulations 60a and 60b may also be provided in other areas of the clamping band, for example, outside of the slot-like opening by providing a central cut and arranging the undulations correspondingly displaced on opposite sides of the cut. FIGS. 7 and 8 show the undulations 60'a and 60'b mutually displaced with respect to one another in the longitudinal direction of the clamping band on opposite sides of a central cut 61.

Figure 9:
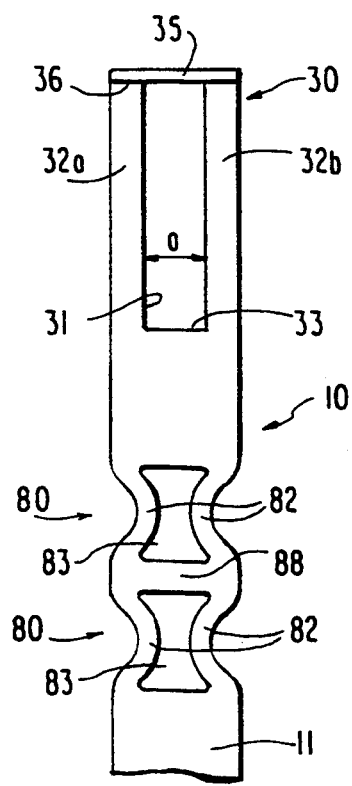
FIG. 9 is a partial top plan view on a still further modified clamp structure in accordance with the present invention.

Furthermore, elastic stretchability to compensate for tolerances as also for temperature and pressure fluctuations may also be achieved by slots in the clamping band as disclosed, for example, in the U.S. Pat. No. 1,705,895 to Blair or in the U.S. Pat. No. 4,910,832 to Schaub et al. However, the clamping band of the clamp structure in accordance with this invention is preferably provided with one or more sections as disclosed in my U.S. Pat. Nos. 4,987,651 and 5,230,246 in which, as shown in FIG. 9, each section generally designated by reference numeral 80 consists of concavely shaped lateral band portions 82 symmetrically arranged with respect to the longitudinal center plane of the clamping band and provided with a window 83 of approximately hourglass shape defined by these concavely shaped lateral band portions, whereby mutually opposite lateral band portions have a minimum spacing in the center and terminate in parts of the clamping band having full band width, with adjacent sections 80 connected by web portions 88, also of full band width, all as disclosed in the aforementioned patent application and patent.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A clamp structure, comprising clamping band means, means for tightening the clamp structure about an object to be fastened thereby, and further means for holding the clamping band means in its tightened condition in such a manner that it provides internal clamping surfaces substantially devoid of any discontinuity, step or offset over substantially its entire circumference to assure a completely satisfactory fluid tight connection, said further means including a tongue-like extension at one end of the clamping band having outwardly extending hook means, a slot-like opening extending in the circumferential direction within the area of the opposite fork-like end portion of the clamping band means, said slot-like opening having a width at least equal to the width of the tongue-like extension, and said opposite end portion being bent up at such point of the clamping band means that the bent-up end section formed thereby includes a small part of said slot-like opening, and said small part of said slot-like opening having a depth, at least, approximately corresponding to the thickness of the clamping band means so that the radially inward edge of said slot-like opening in said bent-up section is adapted to engage with the corresponding hook means and at the same time prevents the tongue-like portion extending therethrough from outward escape.

2. A clamp structure according to claim 1, wherein said tightening means includes two tool-engaging surface means, one of said tool-engaging surface means being formed by said bent-up end section and the other tool-engaging means being formed by an outwardly extending part of the clamping band means.

3. A clamp structure according to claim 2, wherein said outwardly extending part is formed by an outwardly extending cold-deformed, deep-drawn outwardly extending tunnel-shaped embossment separated at both ends from the clamping band means by substantially transversely extending cuts so as to be integral substantially along its sides.

4. A clamp structure according to claim 3, wherein said embossment is located in said clamping band means within the area near the tongue-like extension with the transversely extending surface of said embossment on the side thereof opposite said tongue-like extension forming said other tool-engaging surface means.

5. A clamp structure according to claim 1, wherein said bent-up end section is bent-up at an angle, at least, approaching a right angle.

6. A clamp structure according to claim 5, wherein said angle differs from a right angle by no more than about 30°.

7. A clamp structure according to claim 6, wherein said angle differs from a right angle by no more than about 15°.

8. A clamp structure according to claim 1, wherein the depth of the part of said slot-like opening in said bent-up end section is less than two times the thickness of the clamping band means.

9. A clamp structure according to claim 8, wherein the depth of the part of said slot-like opening portion in said bent-up end section does not exceed the thickness of the clamping band means by more than about 25%.

10. A clamp structure according to claim 1, wherein the depth of the part of said slot-like opening portion in said bent-up end section does not exceed the thickness of the clamping band means by more than about 10%.

11. A clamp structure according to claim 1, wherein the free end portion of said tongue-like extension is bent outwardly.

12. A clamp structure according to claim 11, wherein said outwardly bent free end portion of said tongue-like extension tapers toward the free end and is rounded-off.

13. A clamp structure according to claim 1, wherein the hook means is a cold-deformed pressed-out hook formed by deep-drawing after a substantially transversely extending cut in the clamping band means so as to be integral with the clamping band means along substantially the remainder of its contour.

14. A clamp structure according to claim 13, wherein several of such hook means are provided in said tongue-like extension to provide for an adjustment of the diametric dimension of the installed clamp structure.

15. A clamp structure according to claim 1, further comprising compensating means to impart elastic stretchability to the clamping band means in the longitudinal direction thereof.

16. A clamp structure according to claim 15, wherein said compensating means includes undulation means within the area of and on opposite sides of a longitudinally separated clamping band portion, the undulation means on opposite sides of the clamping band means being displaced with respect to one another in the longitudinal direction of the clamping band means.

17. A clamp structure according to claim 16, wherein said undulation means are provided in the remaining lateral clamping band portions on both sides of the slot-like opening.

18. A clamp structure according to claim 16, wherein said undulation means are provided on opposite sides of a longitudinal cut within the area of full band width clamping band means.

19. A clamp structure according to claim 15, wherein said compensating means include at least one section having concavely shaped lateral band portions substantially symmetrically arranged with respect to the center longitudinal plane of the clamping band means and forming a central opening in the clamping band means between said concavely shaped lateral band portions.

20. A clamp structure according to claim 19, wherein said central opening is of approximately hourglass-shaped configuration.

21. A clamp structure according to claim 20, wherein said concavely shaped lateral band portions are spaced at a minimum distance from one another within the center thereof and terminate in substantially the full band width of the clamping band means.

22. A reusable clamp structure, comprising clamping band means, means for tightening the clamp structure about an object to be fastened thereby, and further means for holding the clamping band means in its tightened condition in such a manner that it provides internal clamping surfaces substantially devoid of any discontinuity, step or offset over substantially its entire circumference to assure a completely satisfactory fluid tight connection, said further means including a tongue-like extension at one end of the clamping band having outwardly extending hook means, a slot-like opening extending in the circumferential direction within the area of the opposite end portion of the clamping band means, said slot-like opening having a width at least equal to the width of the tongue-like extension, and said opposite end portion being bent up at such point of the clamping band means that the bent-up end section formed thereby includes a small part of said slot-like opening so that said end portion has a fork-like appearance as viewed in end elevational view, and said small part of said slot-like opening having a depth which is less than twice the thickness of the clamping band means, said bent-up end section forming an angle, at least, approaching 90° with respect to the longitudinal plane of the clamping band means, and said bent-up end section forming one tool-engaging surface means of said tightening means while another tool-engaging means is formed in said clamping band means within the area thereof near said tongue-like extension.

23. A clamp structure according to claim 22, further comprising compensating means to impart elastic stretchability to the clamping band means in the longitudinal direction thereof.

24. A clamp structure according to claim 23, wherein said compensating means includes undulation means within the area of and on opposite sides of a longitudinally separated clamping band portion, the undulation means on opposite sides of the clamping band means being displaced with respect to one another in the longitudinal direction of the clamping band means.

25. A clamp structure according to claim 23, wherein said compensating means include at least one section having concavely shaped lateral band portions substantially symmetrically arranged with respect to the center longitudinal plane of the clamping band means and forming a central opening in the clamping band means between said concavely shaped lateral band portions.

26. A clamp structure according to claim 22, wherein said hook means have engaging surfaces operable to engage with a corresponding surface of said bent-up end section, and wherein said engaging surfaces and the corresponding surface of said bent-up end section form an angle, at least, approaching 90°.

* * * * *